United States Patent
Lee et al.

(10) Patent No.: US 10,861,459 B2
(45) Date of Patent: Dec. 8, 2020

(54) APPARATUS AND METHOD FOR DETERMINING RELIABILITY OF RECOMMENDATION BASED ON ENVIRONMENT OF VEHICLE

(71) Applicants: Hyundai Motor Company, Seoul (KR); Kia Motors Corporation, Seoul (KR)

(72) Inventors: Kyung Chul Lee, Sujeong-gu (KR); Sung Soo Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 119 days.

(21) Appl. No.: 16/193,495

(22) Filed: Nov. 16, 2018

(65) Prior Publication Data

US 2019/0180744 A1   Jun. 13, 2019

(30) Foreign Application Priority Data

Dec. 11, 2017 (KR) .......................... 10-2017-0169006

(51) Int. Cl.
*G10L 15/22* (2006.01)
*G10L 15/16* (2006.01)
(Continued)

(52) U.S. Cl.
CPC .............. *G10L 15/22* (2013.01); *G06F 16/61* (2019.01); *G06F 16/65* (2019.01); *G06N 3/08* (2013.01); *G06N 7/005* (2013.01); *G10L 15/16* (2013.01); *G10L 15/1815* (2013.01); *G10L 15/26* (2013.01); *G10L 25/30* (2013.01); *G10L 25/51* (2013.01); *G10L 25/84* (2013.01);
(Continued)

(58) Field of Classification Search
None
See application file for complete search history.

(56) References Cited

U.S. PATENT DOCUMENTS

| | | | |
|---|---|---|---|
| 2013/0185065 A1* | 7/2013 | Tzirkel-Hancock | G10L 15/20 704/233 |
| 2017/0323641 A1* | 11/2017 | Shimizu | B60R 16/02 |
| 2018/0150280 A1* | 5/2018 | Rhee | G06F 3/0488 |

* cited by examiner

*Primary Examiner* — Antim G Shah
(74) *Attorney, Agent, or Firm* — Mintz Levin Cohn Ferris Glovsky and Popeo, P.C.; Peter F. Corless

(57) ABSTRACT

An apparatus for determining a reliability of a recommendation based on an environment of a vehicle may include: an input device configured to detect a sound in the vehicle; a storage configured to store information associated with the sound; an output device configured to output information associated with a recommendation action; and a controller electrically connected with the input device, the storage, and the output device. The controller can be configured to: obtain audio information using the input device; obtain acoustic state information of the vehicle based on the audio information and a state of the vehicle, the acoustic state information associated with the state of the vehicle and noise included in the audio information; determine context information of the vehicle when the audio information is obtained; perform speech recognition on the audio information to obtain text information; calculate a recommendation index for one or more actions corresponding to the text information and the context information; and generate a recommendation of at least one of the one or more actions based on the acoustic state information and the calculated recommendation index.

17 Claims, 11 Drawing Sheets

(51) Int. Cl.
  *G10L 25/84* (2013.01)
  *G06F 16/61* (2019.01)
  *G06N 3/08* (2006.01)
  *G06N 7/00* (2006.01)
  *G06F 16/65* (2019.01)
  *G10L 15/18* (2013.01)
  *G10L 25/51* (2013.01)
  *G10L 25/30* (2013.01)
  *G10L 15/26* (2006.01)
  *G10L 15/30* (2013.01)

(52) U.S. Cl.
  CPC ........ *G10L 15/30* (2013.01); *G10L 2015/223* (2013.01); *G10L 2015/228* (2013.01)

$$C = \begin{pmatrix} e_1 & \cdots & e_n \end{pmatrix} \begin{pmatrix} \lambda_1 & & 0 \\ & \ddots & \\ 0 & & \lambda_n \end{pmatrix} \begin{pmatrix} e_1^T \\ \vdots \\ e_n^T \end{pmatrix}$$

FIG. 6

APPARATUS AND METHOD FOR DETERMINING RELIABILITY OF RECOMMENDATION BASED ON ENVIRONMENT OF VEHICLE

CROSS-REFERENCE TO RELATED APPLICATION

This application is based on and claims the benefit of priority to Korean Patent Application No. 10-2017-0169006, filed on Dec. 11, 2017 in the Korean Intellectual Property Office, the disclosure of which is incorporated herein in its entirety by reference.

TECHNICAL FIELD

The present disclosure relates generally to an apparatus and method for determining the reliability of a recommendation based on an environment of a vehicle and, more particularly, to an apparatus and method for determining the reliability of a recommendation for an action corresponding to a voice command based on a conversation.

BACKGROUND

With the development of the auto industry, a speech recognition-based system for automatically performing an action matched with an intent of a user in a vehicle has been developed to enhance the convenience of a driver. For example, an intelligent context-aware analysis system can be used to predict and recommend an action matched with the intent of a user of a vehicle based on a usage history of the user. However, while speech recognition is being performed, noise may exist in the vehicle, such as sounds generated due to driving, air conditioning, window opening, simultaneous speaking, or the like.

In a conventional intelligent context-aware analysis system, analysis accuracy may be influenced by a result of speech recognition. For example, when an accuracy of speech recognition is low, the system may predict or recommend an action that is unsuitable for the intent of the user, since the system predicts or guesses an action irrespective of the accuracy of speech recognition. Thus, the reliability of the system may deteriorate based on environmental conditions of the vehicle. Further, conventional intelligent context-aware analysis systems fail to consider a usage pattern of the user to enhance reliability.

SUMMARY

The present disclosure has been made to solve the above-mentioned problems occurring in the related art while advantages achieved by the related art are maintained intact.

An aspect of the present disclosure provides an apparatus and method for determining the reliability of a recommendation based on an environment of the vehicle. As a result, an action matched with the intent of the user can be accurately predicted or recommended even in an environment where reliability of speech recognition is low.

The technical problems to be solved by the present inventive concept are not limited to the aforementioned problems, and any other technical problems not mentioned herein will be clearly understood from the following description by those skilled in the art to which the present disclosure pertains.

According to embodiments of the present disclosure, an apparatus for determining the reliability of a recommendation based on an environment of a vehicle may include: an input device configured to detect a sound in the vehicle; a storage configured to store information associated with the sound; an output device configured to output information associated with a recommendation action; and a controller electrically connected with the input device, the storage, and the output device. The controller may be configured to: obtain audio information using the input device; obtain acoustic state information of the vehicle based on the audio information and a state of the vehicle, the acoustic state information associated with the state of the vehicle and noise included in the audio information; determine context information of the vehicle when the audio information is obtained; perform speech recognition on the audio information to obtain text information; calculate a recommendation index for one or more actions corresponding to the text information and the context information; and generate a recommendation of at least one of the one or more actions based on the acoustic state information and the calculated recommendation index.

The acoustic state information may include information associated with at least one of the state of the vehicle, a principal component of the noise, or a strength of the noise.

The controller may be configured to classify the audio information based on the state of the vehicle, and create a database (DB) including the classified audio information, the DB being stored in the storage.

The controller may be configured to extract a feature point from the classified audio information based on the DB, and obtain the acoustic state information based on the extracted feature point.

The controller may be configured to perform a principal component analysis to extract the feature point.

The controller may be configured to generate a probability model for classifying the feature point using a neural network.

The context information may include information associated with at least one of a time when the audio information is obtained, a place where the audio information is obtained, and the one or more actions.

The controller may be configured to calculate the recommendation index according to a usage pattern of a user of the vehicle over time, a usage pattern of the user according to place, and a usage pattern for the one or more actions.

The controller may be configured to assign a weight to each of the usage pattern of the user over time, the usage pattern of the user according to place, and the usage pattern for the one or more actions.

The controller may be configured to generate the recommendation of the at least one of the one or more actions based further on the acoustic state information, the calculated recommendation index, and a usage history of a user of the vehicle according to a previous recommendation stored in the storage.

The controller may be configured to select at least one of the one or more actions based on the acoustic state information and the recommendation index; and perform the selected at least one of the one or more actions.

The controller may be configured to output a message for recommending the at least one of the one or more actions via the output device.

The controller may be configured to generate a recommendation of an action to be performed among the one or more actions when each of the acoustic state information and the calculated recommendation index meets a specified condition.

The controller may be configured to provide a list of the one or more actions via the output device when each of the acoustic state information and the recommendation index does not meet the specified condition.

Furthermore, according to embodiments of the present disclosure, a method for determining a reliability of a recommendation based on an environment of a vehicle may include: obtaining, by an input device, audio information; obtaining, by a controller, acoustic state information of the vehicle based on the audio information and a state of the vehicle, the acoustic state information associated with the state of the vehicle and noise included in the audio information; determining, by the controller, context information of the vehicle when the audio information is obtained; performing, by the controller, speech recognition on the audio information to obtain text information; calculating, by the controller, a recommendation index for one or more actions corresponding to the text information and the context information; and generating, by the controller, a recommendation of at least one of the one or more actions based on the acoustic state information and the calculated recommendation index.

The acoustic state information may include information associated with at least one of the state of the vehicle, a principal component of the noise, or a strength of the noise.

The context information may include information about at least one of a time when the audio information is obtained, a place where the audio information is obtained, and the one or more actions.

The generating of the recommendation may include generating, by the controller, the recommendation of the at least one of the one or more actions based further on the acoustic state information, the calculated recommendation index, and a usage history of a user of the vehicle according to a previous recommendation stored in the storage.

The generating of the recommendation may include generating, by the controller, a recommendation of an action to be performed among the one or more actions when each of the acoustic state information and the recommendation index meets a specified condition.

According to an embodiment, the generating of the recommendation may include providing, by the controller, a list of the one or more actions when each of the acoustic state information and the recommendation index does not meet the specified condition.

BRIEF DESCRIPTION OF THE DRAWINGS

The above and other objects, features and advantages of the present disclosure will be more apparent from the following detailed description taken in conjunction with the accompanying drawings:

FIG. 6 is a drawing illustrating an exemplary operation of an apparatus for determining reliability of recommendation based on an environment of a vehicle according to embodiments of the present disclosure;

Figure 1:
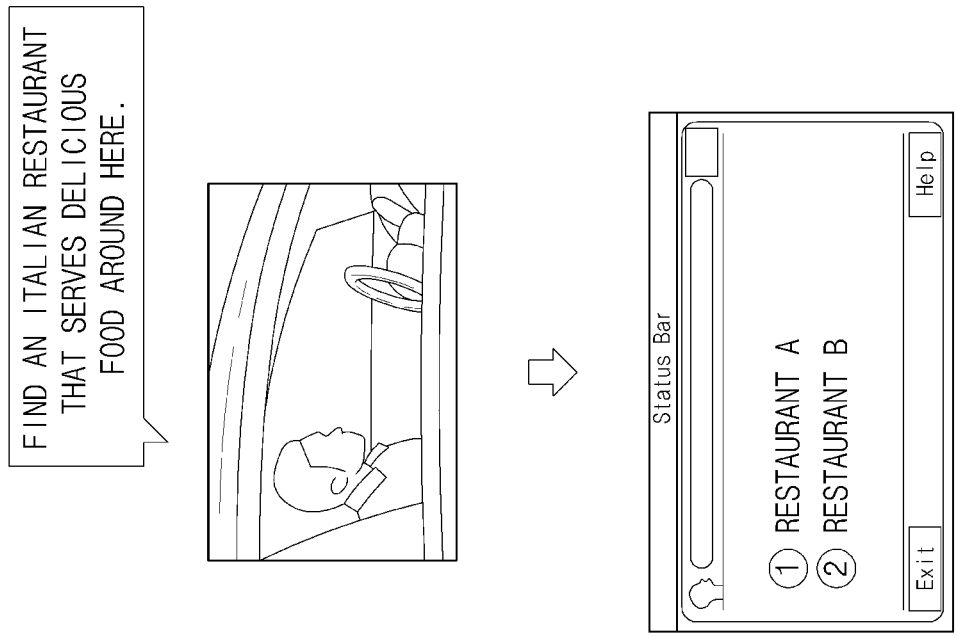
FIG. 1 is a drawing illustrating an environment where apparatus for determining reliability of recommendation based on an environment of a vehicle is operated, according to embodiments of the present disclosure.
Figure 1:
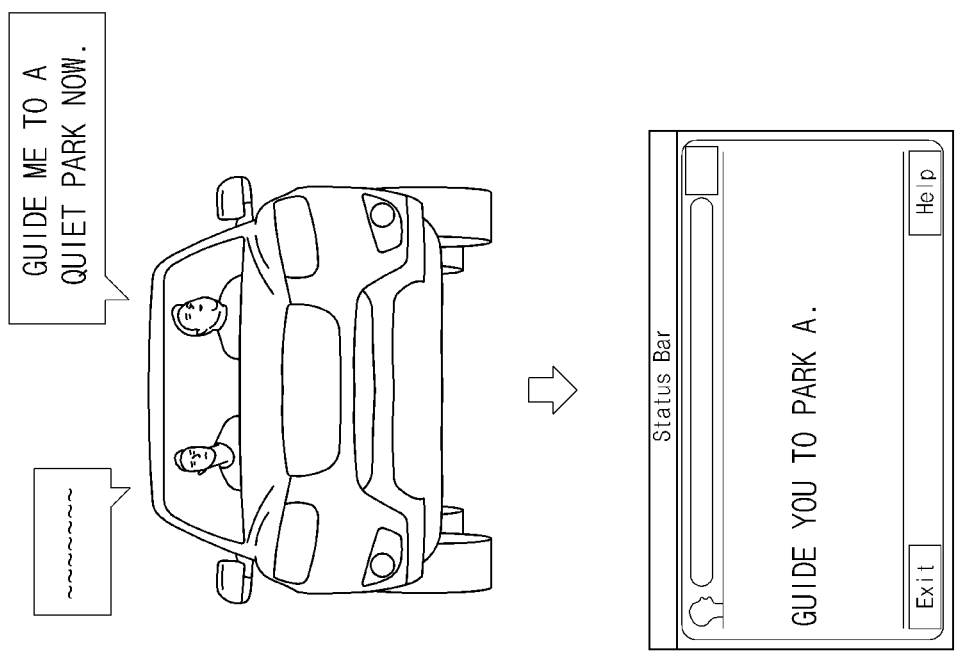

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF EMBODIMENTS

Hereinafter, embodiments of the present disclosure will be described in detail with reference to the accompanying drawings. In adding reference denotations to elements of each drawing, although the same elements are displayed on a different drawing, it should be noted that the same elements have the same denotations. In addition, in describing an embodiment of the present disclosure, if it is determined that a detailed description of related well-known configurations or functions blurs the gist of an embodiment of the present disclosure, it will be omitted.

In describing elements of embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to the presently disclosed embodiments, FIG. 1 is a drawing illustrating an environment where apparatus for determining reliability of recommendation based on an environment of a vehicle is operated, according to embodiments of the present disclosure.

As shown in FIG. 1, the vehicle according to embodiments of the present disclosure may take on two users. The two users may talk with each other in the vehicle during driving. While the two users talk with each other, a driver may speak "please guide me to a quiet park now" for a voice command. While the driver speaks the voice command, a passenger may speak another sentence irrespective of the command. While the driver speaks the voice command, the vehicle may obtain audio information including the voice command, driving noise, and noise spoken around the vehicle. The vehicle may predict one quiet park (e.g., park A) matched with an intent of the user based on a variety of information such as the voice information included in the audio information, a current location of the vehicle, a taste of the user, and weather information. In consideration of context information at a time when acoustic state information and audio information of the vehicle are obtained, the vehicle may perform route guidance to the predicted park A and may output a message of performing route guidance to park A.

According to embodiments of the present disclosure, at least one user can enter and use the vehicle. The user may open a window during driving, for example. While driving with the window open, the driver may speak "please find an Italian restaurant that serves delicious food around here" for a voice command. When the driver speaks the voice command, the vehicle may obtain audio information including the voice command, driving noise, and noise by wind which enters through the window. The vehicle may predict one restaurant (e.g., restaurant A or restaurant B) matched with an intent of the user based on a variety of information such as the voice command included in the audio information, a current location of the vehicle, and a visit history. When it is determined that reliability of prediction is low in consideration of context information at a time when acoustic state information and audio information of the vehicle are obtained, the vehicle may output a list including all of a plurality of proposed sites without recommending one predicted proposed site.

Figure 2:
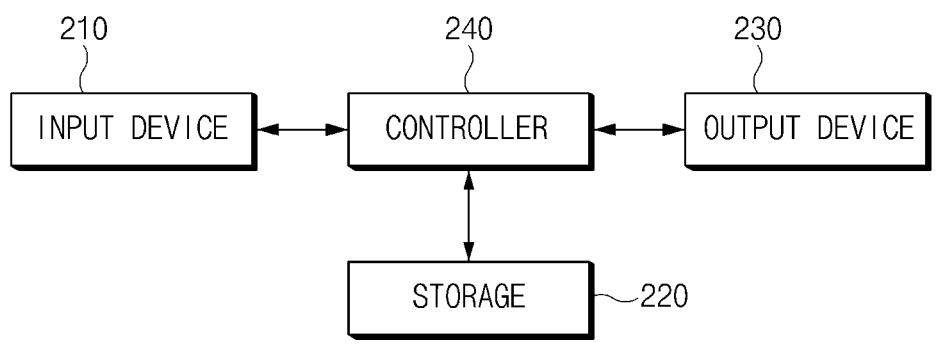
FIG. 2 is a block diagram illustrating a configuration of an apparatus for determining reliability of recommendation based on an environment of a vehicle according to embodiments of the present disclosure.

FIG. 2 is a block diagram illustrating a configuration of an apparatus for determining reliability of recommendation based on an environment of a vehicle according to embodiments of the present disclosure.

As shown in FIG. 2, an apparatus 200 for determining reliability of recommendation based on an environment of a vehicle (hereinafter referred to as "apparatus 200" for convenience of description) according to embodiments of the present disclosure may include an input device 210, a storage 220, an output device 230, and a controller 240. In FIG. 2, for convenience of illustration, the input device 210, the storage 220, the output device 230, and the controller 240 is configured with one block. However, embodiments of the present disclosure are not limited thereto. For example, at least some of the input device 210, the storage 220, the output device 230, and the controller 240 may be implemented in the form of being integrated with each other or being divided into two or more components, depending on an implementation method.

The input device 210 may be a device for receiving an input from the outside (e.g., a user of the vehicle). The input device 210 may include, for example, a microphone or the like. According to embodiments of the present disclosure, the input device 210 may detect a sound in the vehicle. The input device 210 may detect, for example, a voice of the user and may detect noise by driving, air conditioning, window opening, and/or simultaneous speaking.

The storage 220 may include a volatile memory and/or a nonvolatile memory. The storage 220 may store data used by an element of the apparatus 200. According to embodiments of the present disclosure, the storage 220 may store information associated with a sound obtained by the input device 210. The storage 220 may store instructions and/or a database (DB) for executing operations performed by the controller 240.

The output device 230 may be a device for outputting a variety of sensorially recognizable information to the outside. The output device 230 may include, for example, a speaker and/or a display. According to embodiments of the present disclosure, the output device 230 may output information associated with an action to be recommended.

The controller 240 may be electrically connected with the input device 210, the storage 220, and the output device 230. The controller 240 may control the input device 210, the storage 220, and the output device 230 and may perform a variety of data processing and various arithmetic operations.

According to embodiments of the present disclosure, the controller 240 may obtain audio information using the input device 210. For example, the controller 240 may obtain audio information including noise by a voice command and driving of the user, air conditioning, window opening, simultaneous speaking, and/or the like.

The controller 240 may obtain acoustic state information of the vehicle, associated with a state of the vehicle and noise included in audio information based on the audio information and the state of the vehicle. The acoustic state information may include, for example, information associated with a state (e.g., driving, air conditioning, window opening, or the like) of the vehicle, a principal component (e.g., driving, air conditioning, window opening, simultaneously speaking, or the like) of noise, strength (e.g., 0 to 100) of the noise. For example, the controller 240 may obtain acoustic state information including information associated with a state of the vehicle, a principal component of noise, strength of the noise, and the like based on the state of the vehicle, such as a pattern of a waveform, a driving speed, whether to perform air conditioning, and whether to open a window, included in audio information.

In addition, the controller 240 may classify audio information based on a state of the vehicle and may store a DB including the classified audio information in the storage 220. The controller 240 may extract a feature point from audio information classified by analyzing the DB and may obtain at least one of acoustic state information based on the feature point. For example, the controller 240 may extract a feature point by a principal component analysis. The controller 240 may generate a probability model for classifying a feature point using a neural network. A description will be given in detail of classifying the audio information, storing the DB, extracting the feature point, and generating the probability model with reference to FIGS. 5 to 7.

Furthermore, the controller 240 may determine a recommendation index for each of one or more actions corresponding to text information based on the text information obtained by speech recognition from audio information and context information at a time when the audio information is obtained. For example, the controller 240 may obtain text information (e.g., "please find an Italian restaurant that services delicious food around here") corresponding to a voice command included in audio information by performing speech recognition. The controller 240 may obtain context information including information associated with a time (e.g., 1 p.m.) when audio information is obtained, a place (e.g., Seolleung station) where the audio information is obtained, one or more actions (e.g., guide the user to restaurant A and restaurant B) corresponding to text information (e.g., "please find an Italian restaurant that serves delicious food around here"). The controller 240 may determine a recommendation index based on a usage pattern over time, a usage pattern according to a place, and a usage pattern for one or more actions. For example, the controller 240 may determine a recommendation index based on a history where the user visits at lunchtime, a history of guiding the user around Seolleung station, frequency where the user visits restaurants A and B, and the like. The controller 240 may assign a weight to each of a usage pattern over time, a usage pattern according to a place, and a usage pattern for one or more actions. A description will be given of a detailed operation of determining the recommendation index with reference to FIG. 8.

According to embodiments of the present disclosure, the controller 240 may recommend at least one of one or more actions corresponding to text information based on acoustic state information and a recommendation index. The controller 240 may recommend at least one of one or more actions further using a usage history according to previous recommendation stored in the storage 220. The controller 240 may perform at least one of one or more actions selected based on acoustic state information and a recommendation index or may output a message of recommending the at least one of the one or more actions using the output device 230.

When each of acoustic state information and a recommendation index meets a specified condition, the controller 240 may recommend one action to be performed among the one or more actions. For example, when it is determined that reliability of recommendation is greater than or equal to a predetermined level, the controller 240 may recommend one of actions corresponding to text information. When each of the acoustic state information and the recommendation index does not meet the specified condition, the controller 240 may provide a list of the one or more actions via the output device 230. For example, when it is determined that the reliability of the recommendation is less than the predetermined level, the controller 240 may provide a list including all of the actions corresponding to the text information. A description will be given in detail of a detailed operation of recommending the action(s) with reference to FIG. 9.

Figure 3:
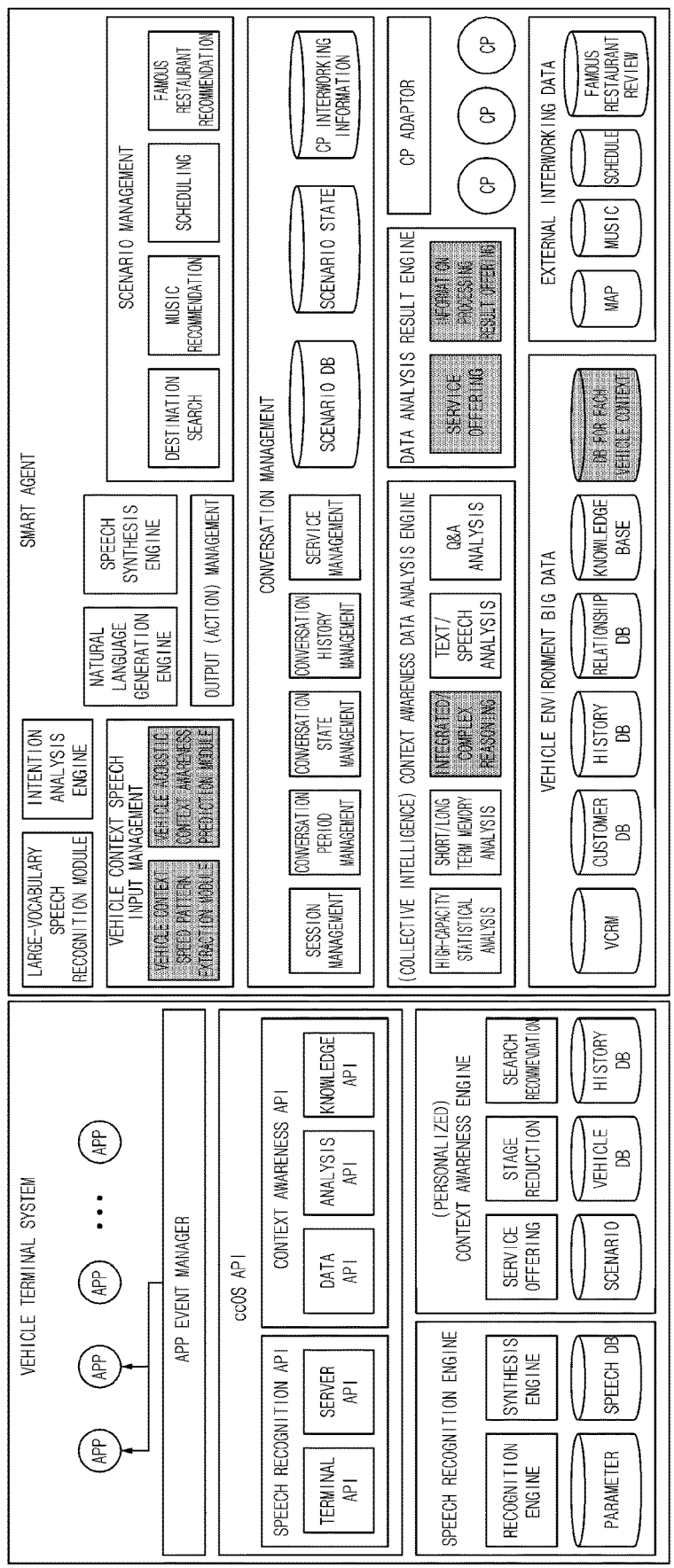
FIG. 3 is a block diagram illustrating a vehicle terminal system included in a vehicle and a smart agent including a speech recognition system according to embodiments of the present disclosure.

FIG. 3 is a block diagram illustrating a vehicle terminal system included in a vehicle and a smart agent including a speech recognition system according to embodiments of the present disclosure.

As shown in FIG. 3, a vehicle may include the vehicle terminal system and the smart agent.

The vehicle terminal system may be classified into an app event manager, a ccOS application programming interface (API), a context awareness engine, and a speech recognition engine.

The app event manager may monitor a vehicle state and an event occurred by an application and may manage and control an application state. The ccOS API may include an API for linking a speech recognition engine of a terminal to a speech recognition engine of a server and an API for linking a context awareness engine to the smart agent. The context awareness engine may recommend or propose a service based on context data and may process an operation stage by applying a context analysis result to result data. Further, the context awareness engine may perform realignment by applying a context analysis result to search information. Since the speech recognition engine is repeated with the smart engine, it may refer to a description of the smart agent below.

The smart agent may be classified into input management, output management, scenario management, conversation management, a context awareness analysis engine, and vehicle environment big data depending on each function.

The input management may include a speech recognition engine and an intent analysis engine. A speech recognition system according to embodiments of the present disclosure may include a function performed by the intent analysis engine.

The speech recognition engine may convert a voice into a text and may recognize a voice for an isolated language in the vehicle terminal system, thus recognizing a large-vocabulary speech in the smart agent. The intent analysis engine may extract an intent frame from a text which is the result of processing speech recognition using natural language processing. Further, the intent analysis engine may classify an intent of a text and may extract an entity which is important information associated with the intent.

The output management may be represented as action management and may include a natural language generation engine and a speech synthesis engine. The speech recognition system according to embodiments of the present disclosure may include a function performed by the output management.

The natural language generation engine may generate a text necessary for an output, by analyzing an action predicted in the future. Further, the natural language generation engine may generate a synthesis related parameter by analyzing the generated text. The speech synthesis engine may convert the text generated by the natural language generation engine into a voice. The speech synthesis engine may synthesize and output a fixed voice in the vehicle terminal system and may synthesize and output an emotional and personalized voice based on a parameter in the smart agent.

The scenario management may manage a scenario (e.g., destination search, music recommendation, scheduling, or the like) for a vehicle service and may include a content provider (CP) adaptor to interwork with external content (e.g., a map, music, a schedule, or the like) outside a vehicle.

The conversation management may include session management, additional conversation management, conversation state management, conversation history management, and service management. The speech recognition system according to embodiments of the present disclosure may include a function performed by the conversation history management.

The session management may manage continuity for each conversation subject (e.g., each intent frame). The additional conversation management may add or delete and manage a conversation subject (e.g., an intent frame). The conversation state management may manage a state between conversation subjects (e.g., intent frames). Further, the conversation history management may determine and reconfigure a correlation between conversation subjects (e.g., intent frames). The service management may manage a service connected with a conversation subject (e.g., an intent frame) or may manage a scenario DB, a state of a scenario, CP interworking, and the like.

The context awareness analysis engine may include functions of a high-capacity statistical analysis, a short/long term memory analysis, integrated/complex reasoning, a text/speech analysis, a question answering (Q&A) analysis. The speech recognition system according to embodiments of the present disclosure may include a function performed by the integrated/complex reasoning.

The high-capacity statistical analysis may include analyzing a usage pattern based on a usage history. The short/long term memory analysis may include an analysis for recovering association information based on a usage history. The integrated/complex reasoning may include mapping different information and inferring the mapped information in a complex manner. The text/speech analysis may include analyzing speech information and text information to infer a context. The Q&A analysis may include analyzing question contents of a user to infer an answer.

The vehicle environment big data may include vehicle customer relationship management (VCRM), customer data, history data, relationship data, and a knowledge base.

The VCRM may include usage information data. The customer data may include subscription customer information data. The history data may include information data indicating a history of where a service is used. The relationship data may include a relationship between data and interworking information. The knowledge base may include knowledge information data necessary for a question and answer.

In one example, the reliability of a recommendation may be determined based on an environment of the vehicle using at least some of the functions shown in FIG. 3.

Figure 4:
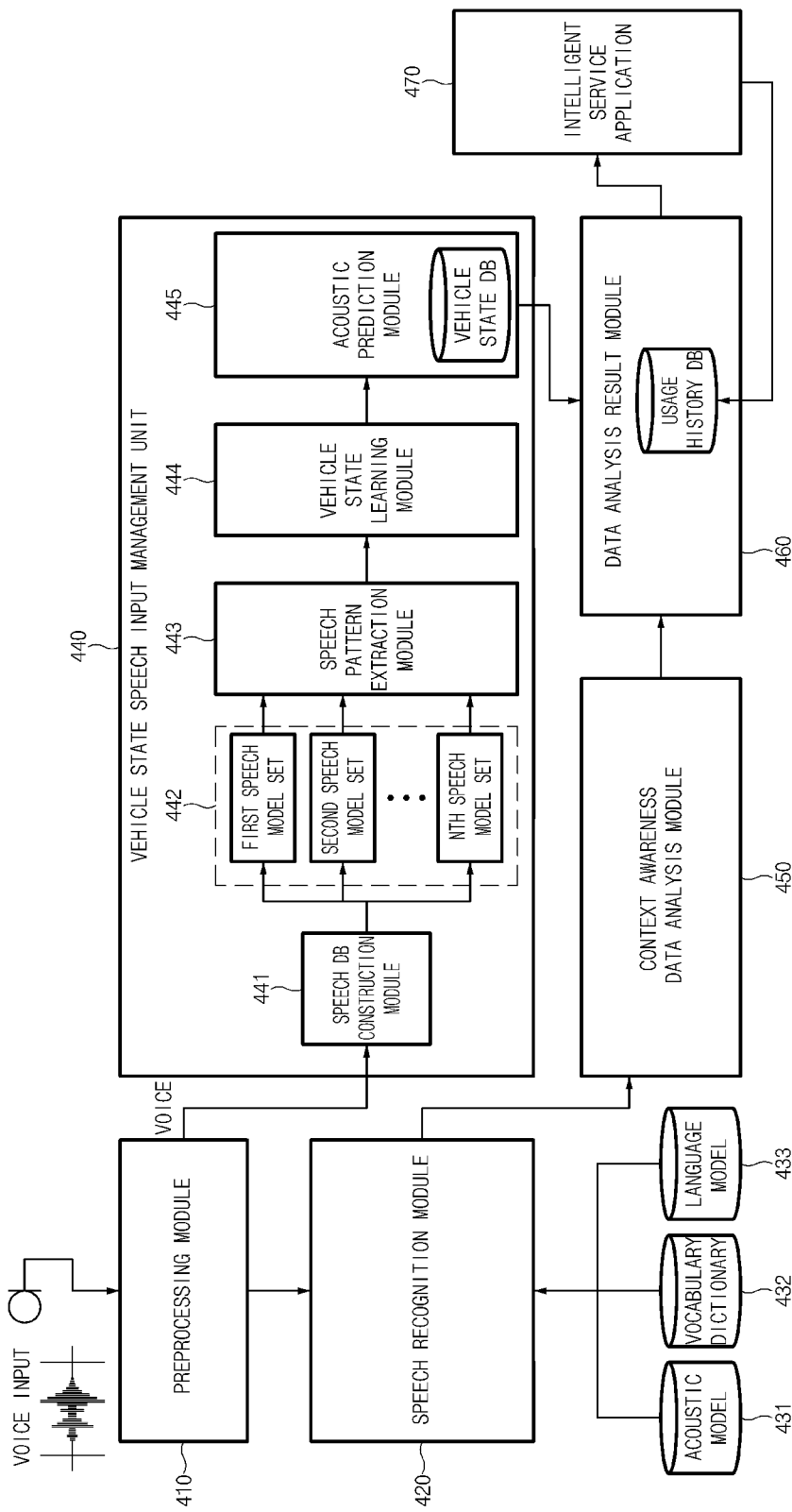
FIG. 4 is a block diagram illustrating a configuration of a software module included in an apparatus for determining reliability of recommendation based on an environment of a vehicle according to embodiments of the present disclosure.

FIG. 4 is a block diagram illustrating a configuration of a software module included in an apparatus for determining reliability of recommendation based on an environment of a vehicle according to embodiments of the present disclosure.

As shown in FIG. 4, the apparatus for determining the reliability of recommendation based on the environment of the vehicle (e.g., a storage 220 of FIG. 2) may store a preprocessing module 410, a speech recognition module 420, a vehicle state speech input management module 440, a context awareness data analysis module 450, a data analysis result module 460, and an intelligent service application 470.

When audio information is obtained by a microphone, the preprocessing module 410 may remove a portion of noise from the audio information.

The speech recognition module 420 may perform speech recognition using the preprocessed audio information. The speech recognition module 420 may include a speech recognition engine and a natural language processing module. The speech recognition module 420 may extract a feature of a voice included in the audio information and may analyze spoken contents. The speech recognition module 420 may classify an intent of a speaker and a keyword slot. The speech recognition module 420 may use an acoustic model 431, a vocabulary dictionary 432, a language model 433, and the like.

The vehicle state speech input management module 440 may include a speed DB construction module 441, a plurality of speech model sets 442, a speech pattern extraction module 443, a vehicle context learning module 444, and an acoustic prediction module 445. The speed DB construction module 441 may receive the preprocessed audio data. The speed DB construction module 441 may classify a model for each state of a vehicle (e.g., a driving speed, a driving roadway, whether to perform air conditioning, a type (e.g., a sedan, a sports utility vehicle (SUV), an electric car, or the like) of the vehicle, window opening and closing, surrounding speaking, and the like). The speed DB construction module 441 may construct the plurality of speech model sets 442 respectively including the classified models. The speech pattern extraction module 443 may extract a speech pattern using at least some of the plurality of speech model sets 442. The speech pattern extraction module 443 may determine an independent variable (e.g., a feature point) by standardizing and analyzing a principal component score of each variable (e.g., driving speed noise or air conditioning noise). The vehicle state learning module 444 may learn the standardized principal component and the feature point and may generate an energy-based probability model capable of classifying a principal component and a feature point for each state. The acoustic prediction module 445 may predict a state of the vehicle using the generated probability model and a vehicle state DB.

The context awareness data analysis module 450 may analyze, predict, and guess an action intended by a user using an intent analyzed by the voice speed module 420, a keyword slot, a memorized driving habit of a driver, and the like. The context awareness data analysis module 450 may operate to provide various actions such as a recommendation/reservation service, location and driving environment recognition technology, and driving situation determination technology. The context awareness data analysis module 450 may determine an action to be recommended and reliability of recommendation.

The data analysis result module 460 may determine a recommendation action using information transmitted from the vehicle state speech input management module 440, information transmitted from the context awareness data analysis module 450, and a usage history DB. For example, the data analysis result module 460 may construct a recommendation action DB based on an action to be recommended, a recommendation index, a principal component score, a feature point score, a usage patter of the user, and the like. The data analysis result module 460 may calculate reliability of a correlation between a past recommendation action and a real action of the user using a neural network and may verify reliability of a usage log, thus calculating a recommendation action activation value. The data analysis result module 460 may determine whether there is a context to recommend an action to the user, based on the recommendation action activation value.

When an action is recommended by the data analysis result module 460, the intelligent service application 470 may perform the recommended action or may output a recommendation message. The intelligent service application 470 may store information associated with the recommended action and an actually performed action in the usage history DB.

Figure 5:
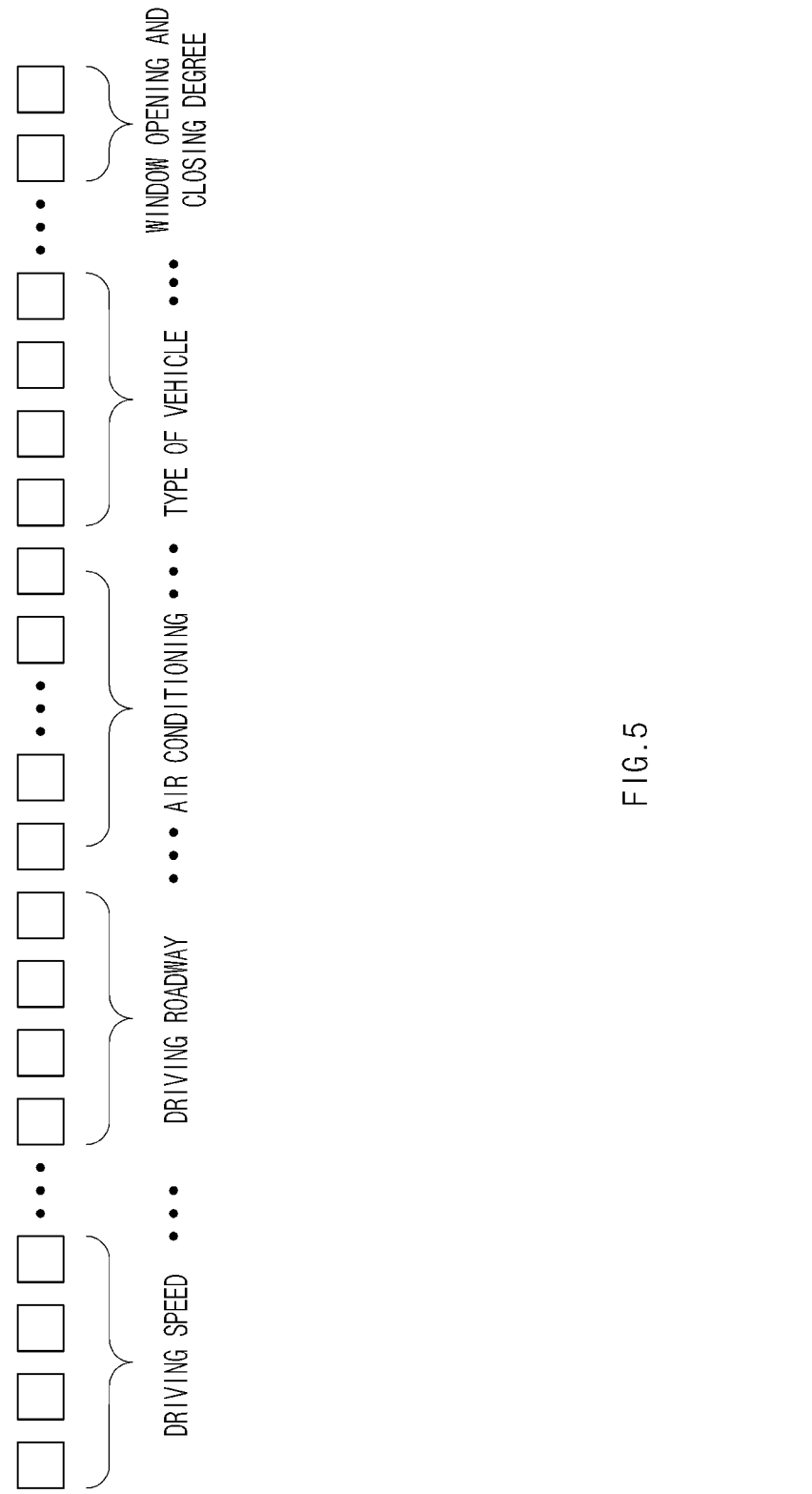
FIG. 5 is a drawing illustrating an exemplary operation of an apparatus for determining reliability of recommendation based on an environment of a vehicle according to embodiments of the present disclosure.

FIG. 5 is a drawing illustrating an exemplary operation of an apparatus for determining reliability of recommendation based on an environment of a vehicle according to embodiments of the present disclosure.

As shown in FIG. 5, the apparatus according to embodiments of the present disclosure may classify audio information based on state information of the vehicle and may store a DB including the classified audio information in a memory. For example, the apparatus may construct an audio DB by classifying a model for each context of the vehicle. The apparatus may obtain information associated with a driving speed, a driving roadway, air conditioning, a type of a vehicle, a window opening and closing degree, and the like. The apparatus may quantize variables of the driving speed, the driving roadway, the air conditioning of the air conditioner, the type of the vehicle, and window opening and closing and may combine and vectorize the quantized variable.

FIG. 6 is a drawing illustrating an exemplary operation of an apparatus for determining reliability of recommendation based on an environment of a vehicle according to embodiments of the present disclosure.

As shown in FIG. 6, the apparatus according to embodiments of the present disclosure may extract a feature point from audio information classified by analyzing its DB and may determine a cause of noise in the vehicle based on the feature point. For example, the apparatus may extract a feature point from obtained vectors using a principal component analysis. C may denote a covariance matrix of a quantization combination vector x, $e_i$ may denote an eigenvector, and $\lambda_i$ may denote an eigenvalue of $e_i$. $e_1$ may represent a vector for a direction with the highest variance, $e_2$ may be perpendicular to $e_1$ and may represent a vector with the second highest variance, and $e_n$ may be perpendicular to $e_1$ to $e_{n-1}$ and may represent a vector with the nth highest variance. The apparatus may use an eigenvector as a feature point. The apparatus may select a predetermined principal component or more (e.g., a principal component of 85%) based on the result of a principal component analysis and may calculate a principal component score. The apparatus may determine an independent variable (i.e., a feature point) and may determine a principal component by standardizing the calculated principal component score of each variable and comparing and analyzing the standardized score.

Figure 7:
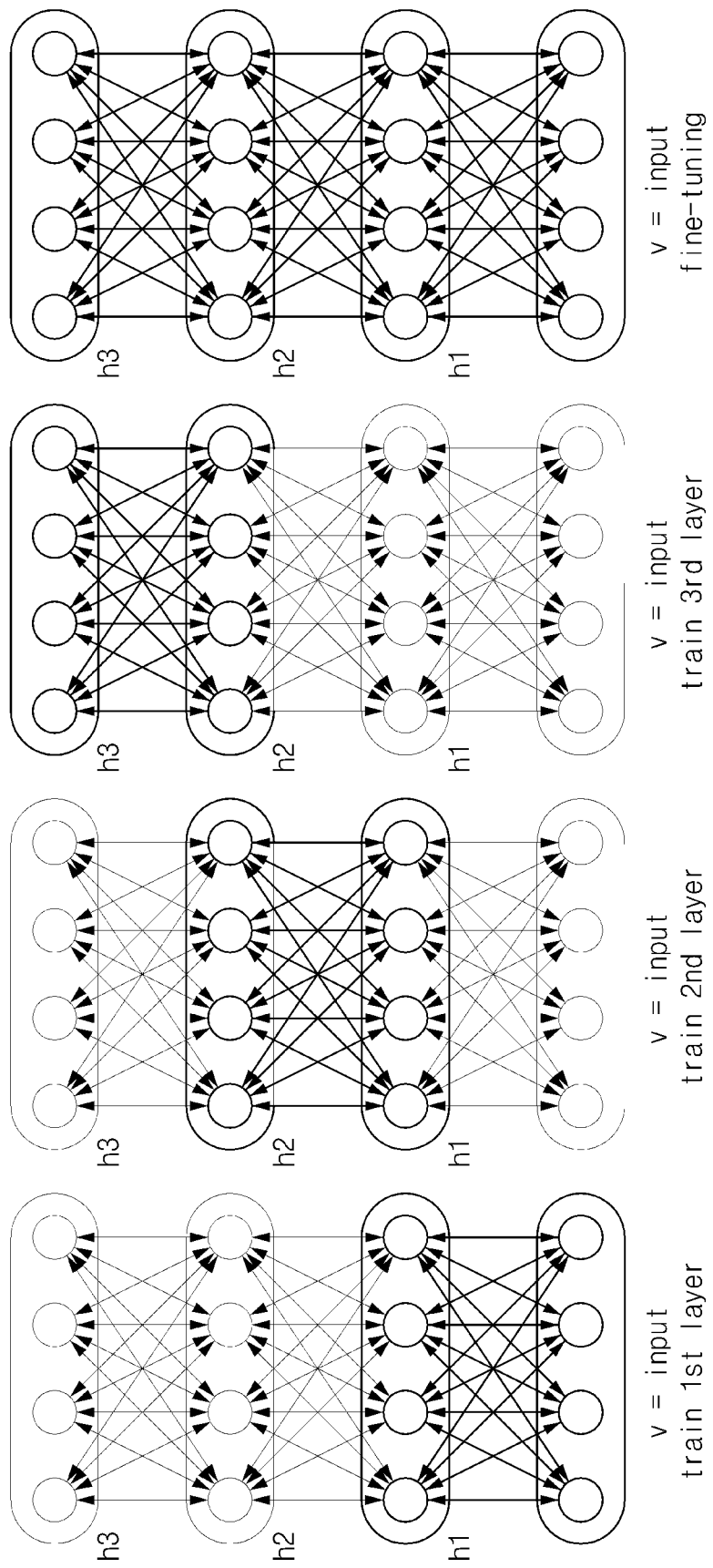
FIG. 7 is a drawing illustrating an exemplary operation of an apparatus for determining reliability of recommendation based on an environment of a vehicle according to embodiments of the present disclosure.

FIG. 7 is a drawing illustrating an exemplary operation of an apparatus for determining reliability of recommendation based on an environment of a vehicle according to embodiments of the present disclosure.

As shown in FIG. 7, the apparatus according to embodiments of the present disclosure may generate a probability model for classifying a feature point using a neural network. The apparatus may learn a standardized principal component and a feature point and may generate an energy-based probability model capable of classifying a principal component and a feature point for each context. Equation 1, provided below, can be used for generating the probability model.

$$E(v, h) = \sum_{i,j} (w_{ij} v_i h_j) \qquad \text{[Equation 1]}$$

Meanwhile, Equation 2, provided below, can be used for updating a weight parameter per learning.

$$w^{j+1} = w^j - \eta \Delta w = w^j - \varepsilon \frac{\partial E}{\partial w} \qquad \text{[Equation 2]}$$

$$\Delta w = \varepsilon (\langle v_i h_j \rangle)_{data} - \varepsilon (\langle v_i h_j \rangle)_{model}$$

The apparatus may generate the energy-based probability model capable of classifying the principal component and the feature point for each context by learning a neural network shown in FIG. 7 for each layer using Equations 1 and 2.

Figure 8:
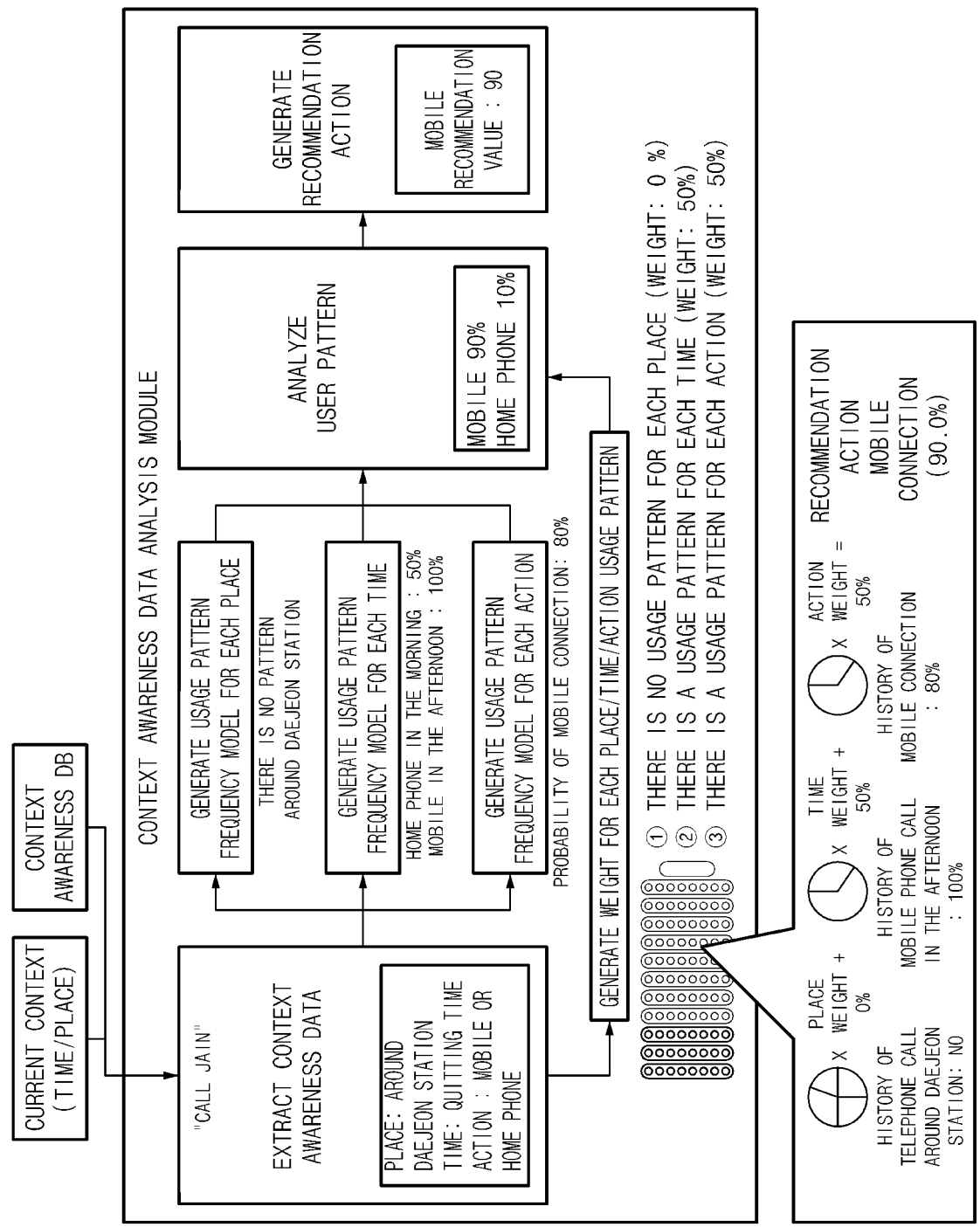
FIG. 8 is a drawing illustrating an exemplary operation of an apparatus for determining reliability of recommendation based on an environment of a vehicle according to embodiments of the present disclosure.

FIG. 8 is a drawing illustrating an exemplary operation of an apparatus for determining reliability of recommendation based on an environment of a vehicle according to embodiments of the present disclosure.

As shown in FIG. 8, the apparatus according to embodiments of the present disclosure may determine a recommendation index for each of one or more actions corresponding to text information based on the text information obtained by speed recognition from audio information and context information at a time when the audio information is obtained. The apparatus may generate a frequency model of a user pattern based on a usage history and a context awareness DB and may analyze and predict the following intelligent system service. For example, the apparatus may extract context awareness data from information associated with a current context, such as a time and place, and the context awareness DB. For example, when the command "call Jain" is obtained, the apparatus may extract information associated with a place (e.g., around Daejeon Station) where the command is obtained, a time (e.g., a quitting time), and an action (e.g., a mobile or home phone). The apparatus may generate a usage pattern frequency model for each of the place, the time, and the action. For example, when there is no history of making a call on a mobile or home phone around Daejeon Station, the apparatus may obtain information indicating that there is no corresponding pattern. The apparatus may obtain information indicating that the frequency of making a call on a home phone in the morning is 50% and that the frequency of making a call on a mobile phone in the afternoon is 100%. The apparatus may obtain information indicating that the frequency of making a connection using the mobile phone between the home phone and the mobile phone is 80%. The apparatus may generate a weight for each of the place, the time, and the action. When there is no pattern associated with the place, the apparatus may determine a weight for the place as "0" and may determine a weight for each of the time and the action as 50%. The apparatus may obtain information indicating that frequency where a user makes a call connection using the mobile phone is 90% and that he or she makes a call connection using the home phone is 10% by applying the obtained information and the weight. The apparatus may generate a recommendation action by determining an action to be recommended as the mobile phone and determining a recommendation index as 90.

Figure 9:
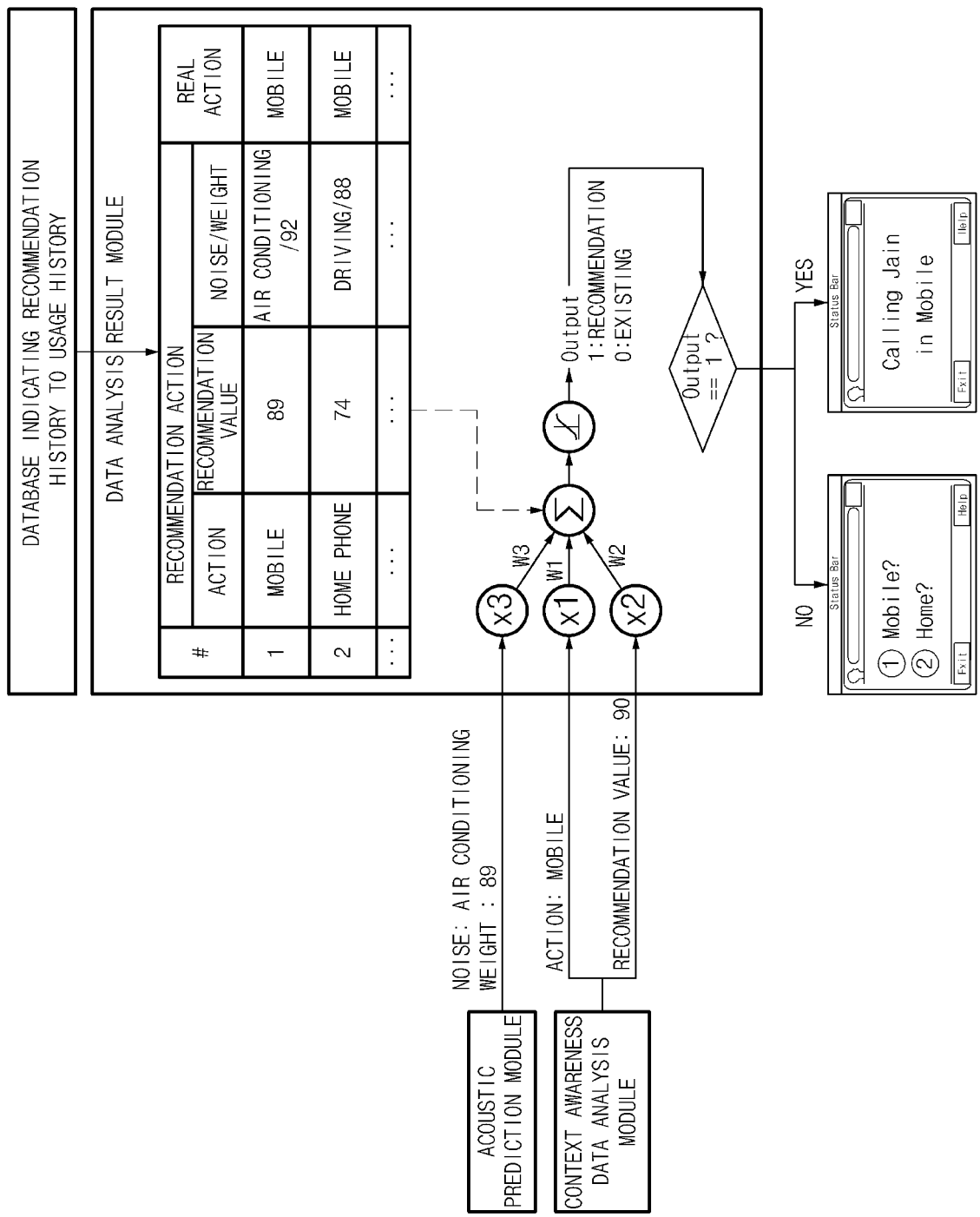
FIG. 9 is a drawing illustrating an exemplary operation of an apparatus for determining reliability of recommendation based on an environment of a vehicle according to embodiments of the present disclosure.

FIG. 9 is a drawing illustrating an exemplary operation of an apparatus for determining reliability of recommendation based on an environment of a vehicle according to embodiments of the present disclosure.

As shown in FIG. 9, the apparatus according to embodiments of the present disclosure may recommend at least one of one or more actions corresponding to text information based on acoustic state information, a recommendation index, and a usage history according to previous recommendation. The apparatus may verify reliability of recommendation based on acoustic state data by an acoustic prediction module, analysis/prediction data by a context awareness data analysis module, and a DB indicating a recommendation history to a usage history and may recommend an action to a user. For example, the apparatus may obtain information indicating that a type of noise is air conditioning, that noise strength is 89, that a recommendation action is a mobile, and that a recommendation index is 90. The apparatus may determine reliability of recommendation based on the usage history that a real action of the user is a mobile when strength of air conditioning noise is 92, when a recommendation index is 89, and where a recommendation action is a mobile. When it is determined that reliability is high, the apparatus may output "1". When it is determined that reliability is low, the apparatus may output "0". In this case, since a recommendation action is the same as a real action when types of noise are the same as each other, when strength of noise is higher, and where a recommendation index is lower, the apparatus may determine that reliability of recommendation is high. Thus, the apparatus may output "1" and may provide a recommendation index of making a call with Jain on a mobile phone. When "0" is output, the apparatus may provide a list of all actions (e.g., a mobile and a home phone) the user is able to take without performing recommendation.

Figure 10:
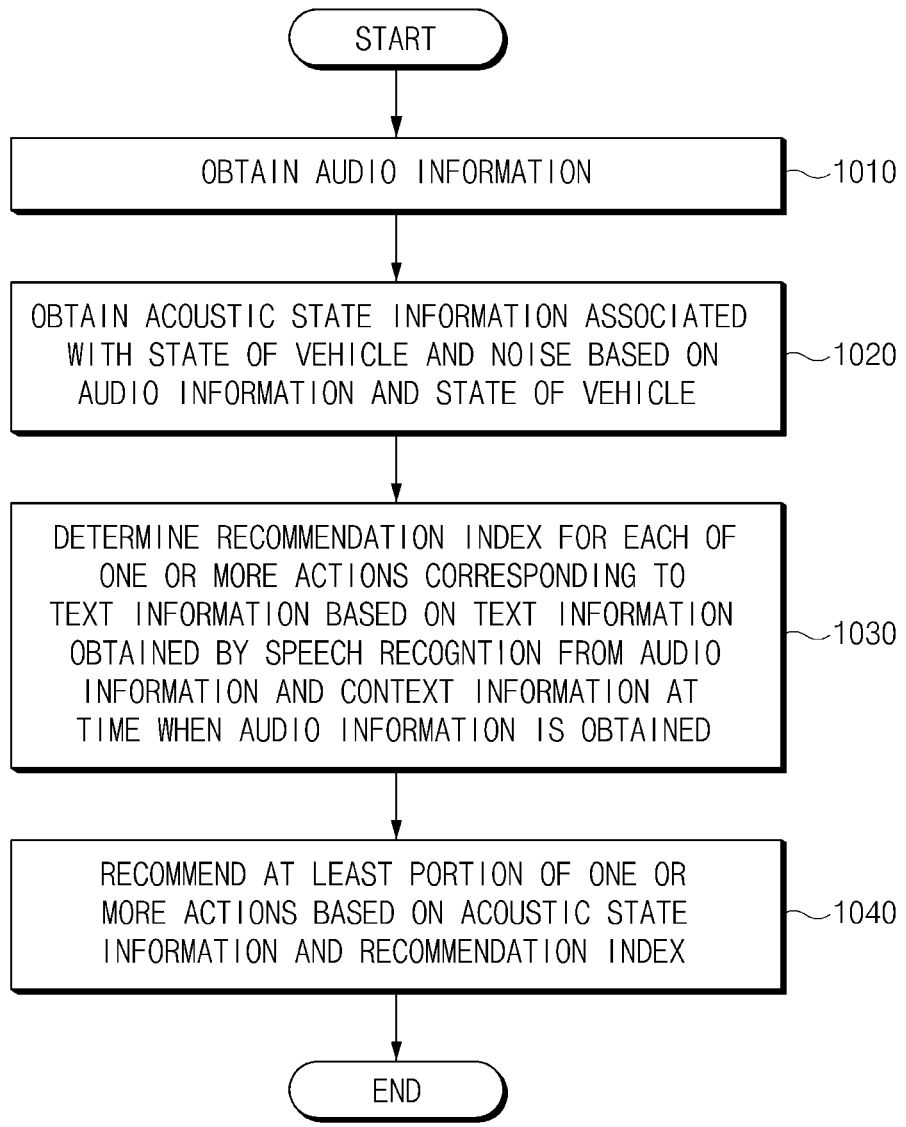
FIG. 10 is a flowchart illustrating a method for determining reliability of recommendation based on an environment of a vehicle according to embodiments of the present disclosure.

FIG. 10 is a flowchart illustrating a method for determining reliability of recommendation based on an environment of a vehicle according to embodiments of the present disclosure.

It may be assumed that an apparatus 200 of FIG. 2 performs a process of FIG. 10. Further, in a description of FIG. 10, an operation described as being performed by an apparatus may be understood as being controlled by a controller 240 of the apparatus 200.

Referring to FIG. 10, in operation 1010, the apparatus may obtain audio information. For example, the apparatus may obtain audio information including a voice command of a user and noise using a microphone and the like.

In operation 1020, the apparatus may obtain acoustic state information in a vehicle, associated with a state of the vehicle and noise included in the audio information based on the audio information and the state of the vehicle. For example, the apparatus may obtain the audio information and information indicating the state of the vehicle and may analyze the audio information and the state information of the vehicle to obtain information indicating an acoustic state in the vehicle.

In operation 1030, the apparatus may determine a recommendation index for each of one or more actions corresponding to text information based on the text information obtained by speech recognition from the audio information and context information at a time when the audio information is obtained. For example, the apparatus may determine a command of the user by speech recognition and may determine a recommendation index for an action to be recommended among actions corresponding to the command in consideration of context information.

In operation 1040, the apparatus may recommend at least one of the one or more actions based on the acoustic state information and the recommendation index. For example, the apparatus may determine reliability of recommendation for a corresponding action based on the acoustic state information and the recommendation index. When the reliability of the recommendation is greater than or equal to a predetermined level, the apparatus may recommend an action to be recommended. For another example, when the reliability of the recommendation is less than the predetermined level, the apparatus may provide a list of the actions corresponding to the command.

Figure 11:
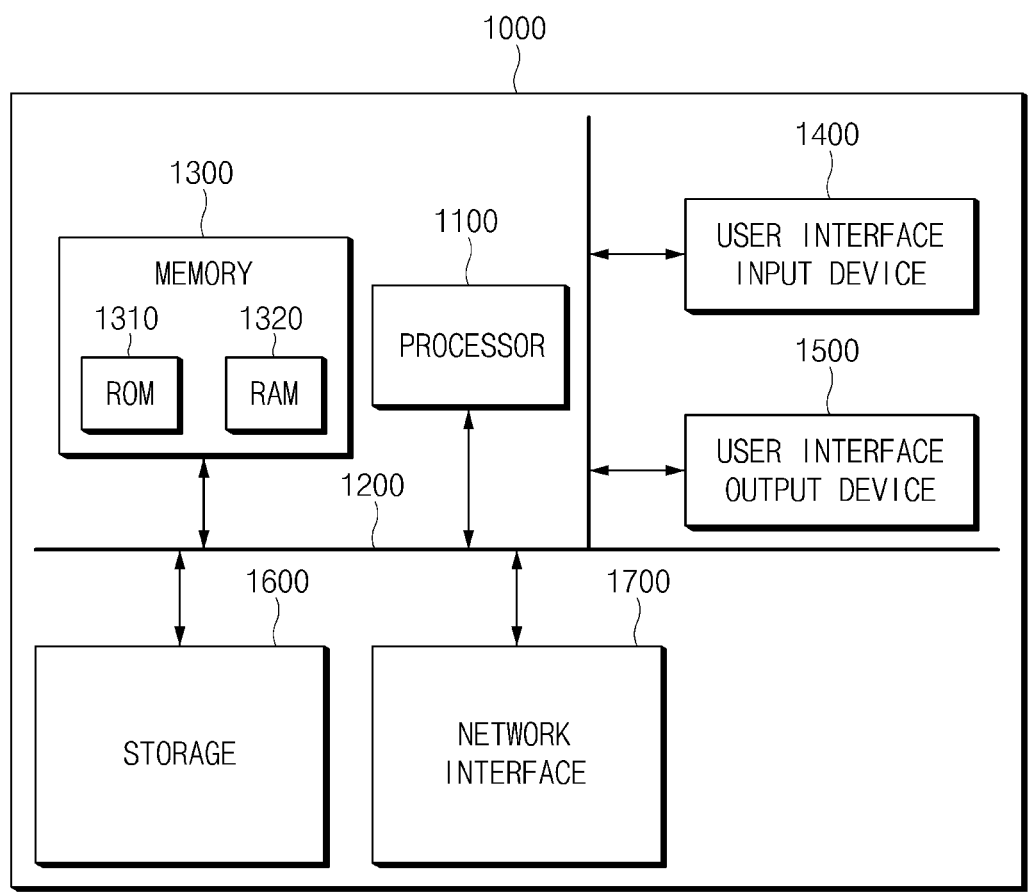
FIG. 11 is a block diagram illustrating a configuration of a computing system according to embodiments of the present disclosure.

FIG. 11 is a block diagram illustrating a configuration of a computing system according to embodiments of the present disclosure.

As shown in FIG. 11, the above-mentioned user input processing method according to embodiments of the present disclosure may be implemented through the computing system. A computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for executing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus and method for determining reliability of recommendation based on the environment of the vehicle according to embodiments of the present disclosure may enhance a probability of recommending an action matched with an intent of the user by recommending an action based on a context of the vehicle at a time when speech recognition is performed and a previous usage pattern of the user.

In addition, various effects indirectly or directly ascertained through the present disclosure may be provided.

While the present disclosure has been described with reference to exemplary embodiments of the present disclosure, it will be apparent to those skilled in the art that various changes and modifications may be made without departing from the spirit and scope of the present disclosure.

Therefore, the embodiments of the present disclosure described herein are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. An apparatus for determining a reliability of a recommendation based on an environment of a vehicle, the apparatus comprising:
   an input device configured to detect a sound in the vehicle;
   a storage configured to store information associated with the sound;
   an output device configured to output information associated with a recommended action; and
   a controller electrically connected with the input device, the storage, and the output device,
   wherein the controller is configured to:
   obtain audio information using the input device;
   obtain acoustic state information of the vehicle based on the audio information and a state of the vehicle, the acoustic state information associated with the state of the vehicle and noise included in the audio information;
   determine context information of the vehicle when the audio information is obtained;
   perform speech recognition on the audio information to obtain text information;
   calculate a recommendation index for one or more actions corresponding to the text information, the context information, and pattern information; and
   generate a recommendation of at least one of the one or more actions based on the acoustic state information and the calculated recommendation index,
   wherein the context information comprises information associated with at least one of a time when the audio information is obtained, a place where the audio information is obtained, or the one or more actions, and
   wherein the pattern information comprises at least one of a usage pattern of a user of the vehicle over time, a usage pattern of the user according to the place, or a usage pattern for the one or more actions.

2. The apparatus of claim 1, wherein the acoustic state information comprises information associated with at least one of the state of the vehicle, a principal component of the noise, or a strength of the noise.

3. The apparatus of claim 1, wherein the controller is further configured to:
   classify the audio information based on the state of the vehicle; and
   create a database (DB) including the classified audio information, the DB being stored in the storage.

4. The apparatus of claim 3, wherein the controller is further configured to:
   extract a feature point from the classified audio information based on the DB; and
   obtain the acoustic state information based on the extracted feature point.

5. The apparatus of claim 4, wherein the controller is further configured to:
   perform a principal component analysis to extract the feature point.

6. The apparatus of claim 4, wherein the controller is further configured to:
   generate a probability model for classifying the feature point using a neural network.

7. The apparatus of claim 1, wherein the controller is further configured to:
   assign a weight to each of the usage pattern of the user over time, the usage pattern of the user according to place, and the usage pattern for the one or more actions.

8. The apparatus of claim 1, wherein the controller is further configured to:
   generate the recommendation of the at least one of the one or more actions based further on the acoustic state information, the calculated recommendation index, and a usage history of a user of the vehicle according to a previous recommendation stored in the storage.

9. The apparatus of claim 1, wherein the controller is further configured to:
   select at least one of the one or more actions based on the acoustic state information and the recommendation index; and
   perform the selected at least one of the one or more actions.

10. The apparatus of claim 1, wherein the controller is further configured to:
    output a message for recommending the at least one of the one or more actions via the output device.

11. The apparatus of claim 1, wherein the controller is further configured to:
    generate a recommendation of an action to be performed among the one or more actions when each of the acoustic state information and the calculated recommendation index meets a specified condition.

12. The apparatus of claim 11, wherein the controller is further configured to:
    provide a list of the one or more actions via the output device when each of the acoustic state information and the recommendation index does not meet the specified condition.

13. A method for determining a reliability of a recommendation based on an environment of a vehicle, the method comprising:
    providing an input device configured to detect a sound in the vehicle, a storage configured to store information associated with the sound, an output device configured to output information associated with a recommended action, and a controller electrically connected with the input device, the storage, and the output device;
    obtaining, by the input device, audio information;
    obtaining, by the controller, acoustic state information of the vehicle based on the audio information and a state of the vehicle, the acoustic state information associated with the state of the vehicle and noise included in the audio information;
    determining, by the controller, context information of the vehicle when the audio information is obtained;
    performing, by the controller, speech recognition on the audio information to obtain text information;
    calculating, by the controller, a recommendation index for one or more actions corresponding to the text information, the context information, and pattern information; and
    generating, by the controller, a recommendation of at least one of the one or more actions based on the acoustic state information and the calculated recommendation index, wherein the context information comprises information associated with at least one of a time when the audio information is obtained, a place where the audio information is obtained, or the one or more actions, and wherein the pattern information comprises at least one of a usage pattern of a user of the vehicle over time, a usage pattern of the user according to place, or a usage pattern for the one or more actions.

14. The method of claim 13, wherein the acoustic state information comprises information associated with at least one of the state of the vehicle, a principal component of the noise, or a strength of the noise.

15. The method of claim 13, wherein the generating of the recommendation comprises:

generating, by the controller, the recommendation of the at least one of the one or more actions based further on the acoustic state information, the calculated recommendation index, and a usage history of a user of the vehicle according to a previous recommendation stored in the storage.

16. The method of claim 13, wherein the generating of the recommendation comprises:

generating, by the controller, a recommendation of an action to be performed among the one or more actions when each of the acoustic state information and the recommendation index meets a specified condition.

17. The method of claim 16, wherein the generating of the recommendation comprises:

providing, by the controller, a list of the one or more actions when each of the acoustic state information and the recommendation index does not meet the specified condition.

* * * * *